3,534,097
MANUFACTURE OF UREA

Raymond James Edward Williams, Sussex, England, assignor to National Research Development Corporation, London, England
No Drawing. Filed Mar. 7, 1967, Ser. No. 621,127
Claims priority, application Great Britain, Mar. 8, 1966, 10,170/66
Int. Cl. C07c *127/00*
U.S. Cl. 260—555     3 Claims

ABSTRACT OF THE DISCLOSURE

A free-flowing granular form of urea is prepared by forming an adduct between urea and a liquid alicyclic ketone, precipitating the adduct, and finally heating the adduct to remove the liquid alicyclic ketone.

---

The invention relates to improvements in the manufacture of urea.

Urea is produced in large quantities for a variety of applications, a highly important use being as an agricultural fertiliser. Commercially produced urea is normally isolated by crystallisation from water at a late stage of its manufacturing process and the urea may be sold in the crystalline form thus obtained. However, this crystalline product is very poor flowing as a result of the large length to breadth ratio of the crystals and this, in combination with the marked tendency of the product to cake, has rendered its large-scale application as a fertiliser difficult. To overcome the disadvantages of this crystalline form of urea it has become the general practice to further treat the urea to yield a free-flowing, rounded form. This further treatment, known as prilling, comprises melting the crystalline urea, forming a spray of melted urea and allowing the urea spray to fall through a cooling tower so that solid, rounded granules are obtained. The prilling process, however, suffers from the disadvantage that at the temperature of at least 132.7° C. required for melting the urea some decomposition of the urea takes place to give a proportion of biuret which is harmful when the urea is applied to certain crops as a fertiliser. In addition, the capital cost of prilling plant and the thermal energy required to melt the crystalline urea represent a considerable part of the total cost of manufacturing urea.

The present invention aims to provide a process for producing urea in a free-flowing granular form, which process avoids the necessity for prilling treatment and which is relatively straightforward and inexpensive to employ. A further object is to provide urea in which the biuret impurity is insufficient to cause significant crop damage.

The invention provides a process by which urea is isolated directly from solution in a rounded, free-flowing granular form. This process in accordance with the invention broadly comprises forming a solution of urea in a liquid medium containing a liquid alicyclic ketone, adjusting the temperature of the liquid medium so that an adduct of urea and the alicyclic ketone crystallises out from the liquid medium, separating the crystalline adduct from the liquid medium and heating the adduct to drive off the liquid alicyclic ketone to leave urea in a desirable free-flowing granular form. The preferred liquid alicyclic ketones are cyclohexanone and cyclopentanone.

The preferred procedure for forming the solution of urea in a liquid medium from which the adduct can be produced comprises interacting a liquid alicyclic ketone and a solution of urea in a suitable solvent. Such suitable solvents are preferably hydroxylic solvents for example lower aliphatic alcohols and, particularly advantageously water. This preferred procedure is especially applicable as a final stage in the commercial manufacture of urea since as aqueous solution of urea normally produced in existing manufacturing process may be interacted directly with the liquid alicyclic ketone. An additional advantage where an aqueous solution of urea is to interacted is that the preferred liquid alicyclic ketones are substantially immiscible with water so that there may be a ready separation and recovery of these liquid components after the adduct has been formed, without the necessity for distillation.

An alternative procedure for forming the solution of urea in a liquid medium from which the adduct can be produced comprises dissolving urea directly in a liquid alicyclic ketone, but this method suffers from the disadvantage that urea has only a low solubility in alicyclic ketones so that large quantities of the ketones are required to yield a relatively small quantity of adduct. This disadvantage may be overcome to a large extent by dissolving the urea in a solvent mixture consisting of a liquid alicyclic ketone and a solvent in which urea is quite soluble, for example hydroxylic solvents such as lower aliphatic alcohols.

The temperature at which the adduct is formed depends upon which procedure for forming the adduct is used and upon the particular liquid alicyclic ketone and the particular urea solvent, if any, which is chosen. However, this temperature will generally be in the range of between about 0°–100° C.

The temperature at which the adduct may be crystallised from solution is similarly dependant upon the choice of preparative procedure, alicyclic ketone and urea solvent and the relative proportions of these reactants. Suitable crystallisation temperatures are of a similar order to the temperature at which the adduct forming reagents are reacted by, in general, the liquid medium is cooled to induce crystallisation of the adduct. The adduct crystallisation temperature is preferably below 65° C. to avoid the formation of crystalline urea.

Typically, the proportion of alicyclic ketone present in the adduct is found to be between about 30 and 40% by weight of the adduct, which corresponds to about 0.6 mole urea per ketone carbon atom in the alicyclic ketone. The proportions of urea and alicyclic ketone are preferably reacted in the proportions in which they occur in the adduct, normally in the molar ratio of 3.0–3.5 to 1.0 but the proportion of urea may be varied between about 6.0 to 1.0 and about 2.5 to 1.0 without preventing the formation of the adduct.

The temperature at which the separated urea adduct is heated to drive off the liquid alicyclic ketone is generally in the region of about 50°–100° C. and this temperature is sufficiently low to avoid causing an undesirable increase in the biuret content of the urea produced.

Normally, the liquid alicyclic ketone is readily completely removed from the adduct by heating to leave pure urea in the desirable free-flowing form. If, however, the heating applied is inadequate to remove all the liquid alicyclic ketone, the residual ketone is left within the interior of the urea crystals rather than on the crystal surface.

It will be appreciated that processes in accordance with the invention may be readily adapted for continuous production of urea by suitable adjustment of the temperatures and concentrations of the reactants employed.

Typical examples of the preparation of free-flowing, granular urea in accordance with the invention will now be described. Examples 1, 2, 3 and 4 illustrate the preferred procedure for forming the adduct and Example 5 illustrates an alternative procedure.

EXAMPLE 1

50 g. of urea are dissolved in 50 ml. of water at 25° C. and 25 ml. of cyclohexanone are added to this urea solution. The resulting mixture is then cooled to 11° C. with stirring and urea-cyclohexanone adduct separates out in the form of single and aggregated crystals. The product is separated by filtration or centrifuging and dried at 70° C. to remove the cyclohexanone which is recovered for use again. 26.5 g. of urea is obtained in a non-caking, free-flowing form which all passes easily through a 10 B.S.S. sieve.

There is of course no loss of urea since the urea remaining in solution would be used in a subsequent reaction in an industrial process.

EXAMPLE 2

70 g. urea are dissolved in 28 ml. water at 62° C. and 56 ml. cyclohexanone at 60° C. are added to this urea solution. The resulting mixture is stirred for 3 minutes then cooled to 20° C., with stirring, during 10 minutes. The adduct is obtained in the form of single and aggregated hexagonal crystals and is filtered and dried as in Example 1. Yield 58 g.

EXAMPLE 3

22 g. urea are dissolved in 28 ml. water at 25° C. and 25 ml. cyclopentanone are added. The resulting mixture is cooled to 10° C. with stirring and a urea-cyclopentanone adduct separates out in the form of single and aggregated hexagonal crystals. The product is filtered and dried as in Examples 1 and 2. Yield 10 g.

EXAMPLE 4

140 g. urea are dissolved in 56 ml. water and the temperature adjusted to 62° C. The solution is stirred and 120 ml. cyclohexanone are added, the base temperature being allowed to fall to 55° C. at the end of the addition. The mixture is stirred until the adduct begins to form with an accompanying rise in temperature, usually within two to three minutes. It is then cooled to 20° C. with continued stirring and the product separated at the vacuum pump. The adduct is then heated in the oven or on a hot-table at 70°–80° C. to eliminate residual mother liquor and included cyclohexanone. The final product may be easily passed through a 5 B.S.S. or 10 B.S.S. sieve to give urea in the form of free-flowing, non-caking granules. Yield 120 g.

EXAMPLE 5

150 ml. of a mixed solvent consisting by volume of 2 parts of cyclohexanone and 1 part of methanol are saturated with urea at 30° C. and the resulting solution is stirred and cooled to just below 20° C. to yield crystalline particules of a urea-cyclohexanone adduct.

Stirring is continued and to this base solution, now containing an adequate quantity of seed crystals, is added in a steady stream urea dissolved in the mixed solvent at 60° C. in a proportion of 36 g. of urea/450 mls. of solvent. The temperature of the resulting mixture is maintained at 20°–25° C. by external cooling and at the completion of the addition the adduct produced is separated by filtration. The adduct is dried at 60° C. to remove methanol and cyclohexanone and the product obtained consists of 25 g. of free-flowing crystals of urea in a pseudomorphic hexagonal form.

I claim:

1. A process for the preparation of urea in a granular, free-flowing form which comprises:
    forming an adduct of urea at a temperature between about 0° C. and 100° C. by reacting urea with a liquid medium selected from the group consisting of liquid (1) cyclopentanone and cyclohexanone and (2) admixtures of (1) in the presence of hydroxylic solvents selected from the group consisting of water and lower aliphatic alcohols whereby a solution of said adduct is formed;
    adjusting the temperature of said solution to a temperature of no greater than about 65° C. to crystallize from the liquid medium a crystalline adduct of urea and said liquid alicyclic ketone;
    separating said crystalline adduct; and
    heating said crystalline adduct at a temperature in the range of about 50 to 100° C. to drive off said liquid medium whereby urea in a granular free-flowing form is produced.

2. A process according to claim 1 in which said solution is formed by interacting cyclopentanone or cyclohexanone with a solution of urea in said hydroxylic solvent.

3. A process according to claim 1 in which the ratio by weight of urea to said liquid medium is between about 6:1 and 2.5:1.

References Cited

UNITED STATES PATENTS

| | | | |
|---|---|---|---|
| 3,378,584 | 4/1968 | Hollowell | 260—555 |
| 3,123,637 | 3/1964 | Lard et al. | 260—555 |
| 3,112,343 | 11/1963 | Allgeuer et al. | 260—555 |
| 2,520,715 | 7/1950 | Fetterly | 260—555 |

FOREIGN PATENTS

| | | |
|---|---|---|
| 876,676 | 9/1961 | Great Britain. |
| 944,875 | 12/1963 | Great Britain. |

OTHER REFERENCES

McKay et al.: Canadian Journal of Chemistry, vol. 42 (1), pp. 10–16 (1964).

BERNARD HEFLIN, Primary Examiner

M. W. GLYNN, Assistant Examiner

U.S. Cl. X.R.

260—96.5